(12) United States Patent
Lee et al.

(10) Patent No.: US 6,175,453 B1
(45) Date of Patent: Jan. 16, 2001

(54) ZOOM LENS

(75) Inventors: Hung-Te Lee; Chen-Chin Cheng, both of Taipei (TW)

(73) Assignee: Industrial Technology Research Institute, Hsinchu (TW)

( * ) Notice: Under 35 U.S.C. 154(b), the term of this patent shall be extended for 0 days.

(21) Appl. No.: 09/371,962

(22) Filed: Aug. 11, 1999

(51) Int. Cl.$^7$ .................................................. G02B 15/14
(52) U.S. Cl. ........................ 359/687; 359/686; 359/680; 359/681; 359/682
(58) Field of Search ................................... 359/687, 686, 359/680, 681, 682

(56) References Cited

U.S. PATENT DOCUMENTS 5,872,658 * 2/1999 Ori .......................................... 359/677

* cited by examiner

Primary Examiner—Scott J. Sugarman
Assistant Examiner—Michael A Lucas
(74) Attorney, Agent, or Firm—Dougherty & Troxell

(57) ABSTRACT

An improved zoom lens constitutes a plurality of lens groups of different focal length. Through adjusting the position of the lens groups, different zooming ratio may be obtained. Higher image resolution and lower cost may also be achieved through using different lens material. The lens groups have respectively focal length combination of positive, negative, positive and positive. The second and fourth lens groups are movable for obtaining high quality image.

19 Claims, 3 Drawing Sheets

ZOOM LENS

BACKGROUND OF THE INVENTION

1. Field of the Invention

This invention relates to an improved zoom lens and particularly to a high image resolution zoom lens resulting from adjusting lens groups focal length and their relative distances and by adding a filter.

2. Description of the Prior Art

A conventional zoom lens usually includes a plurality of lens groups. Through adjusting focal point distance and improving lens material, better quality images may be obtained. It is widely used in conventional film cameras and video cameras, and in recent years in digital cameras which store image in disk in digital format. The quality and resolution power of a zoom lens greatly affect the final image quality. The lens are positioned along an optimal axis. Each lens group may constitute a number of lenses of different focal length. Through adjusting the position of the lens groups, the composite focal length of the lens groups will be changed for obtaining different zooming power desired. For operational purpose, some of the lens groups will remain stationary while some other lens groups are movable. However conventional zoom lenses generally do not take total considerations of weight, size, space and resolution power of the lens groups. The difference between the first and the last lens groups usually is great. It needs special structure to provide adequate support.

U.S. Pat No. 5,285,316 discloses one of the examples. It has four lens groups 1–4 consisting of a plurality of lens L1–L11 of different focal length d1–d19. The lenses have different radius of curvature r1–r20. The focal length d1–d19 lay along an optimal axis 7. The second lens group 2 includes lenses L4–L6 to form a negative curvature and is movable along the axis 7. The optimal zooming image effect is obtained by adjusting the position of the second lens group along the optimal axis 7. The image light passes through a filter 5 and forms a final image on an imaging plane 6. There is a stop S being provided between the second and third lens group 2, 3 to prevent the second lens group 2 from hitting the third lens group 3 that might cause damage.

Because only the second lens group 2 is movable, and the focal length variation of d1–d49 is limited, the zooming power is not desirable. The resolution is also not satisfactory. Furthermore, the first lens group has a relatively larger size than the lens group 2–4. The overall lens structure needs special reinforcement to support the heavy weight of the first lens group 1. It increases production cost.

SUMMARY OF THE INVENTION

It is an object of this invention to provide an improved zoom lens to obtain optimal zoom effect and high resolution image through adjusting the position of the lens groups.

In one aspect of this invention, the zoom lens includes from the object side a first, a second, a third and a fourth lens group with respectively a positive, negative, positive and positive refractive power. The center points and focal points of all four lens groups are on a same optimal axis. Through arranging the position of these four lenses groups and a filter and an image plane located behind the lens groups, an optimal zooming effect and a high resolution and quality image may be obtained.

Each lens group constitutes a plurality of lenses of different focal length. Through arranging their positions, the zooming effect desired may be obtained. Two of the lens groups consist of lens made of plastic material and in non-spherical forms to avoid producing fuzzy image or the so called "fish-eye" effect usually happened to spherical lenses.

BRIEF DESCRIPTION OF THE DRAWINGS

The invention, as well as its many advantages, may be further understood by the following detailed description and drawings in which.

DESCRIPTION OF THE PREFERRED EMBODIMENTS

The zoom lens according to this invention includes a plurality of lens groups each consisting of a plurality of lenses of different focal length. Through arranging the lens groups to different positions, an optimal zooming effect and high resolution image may be obtained.

Figure 1:
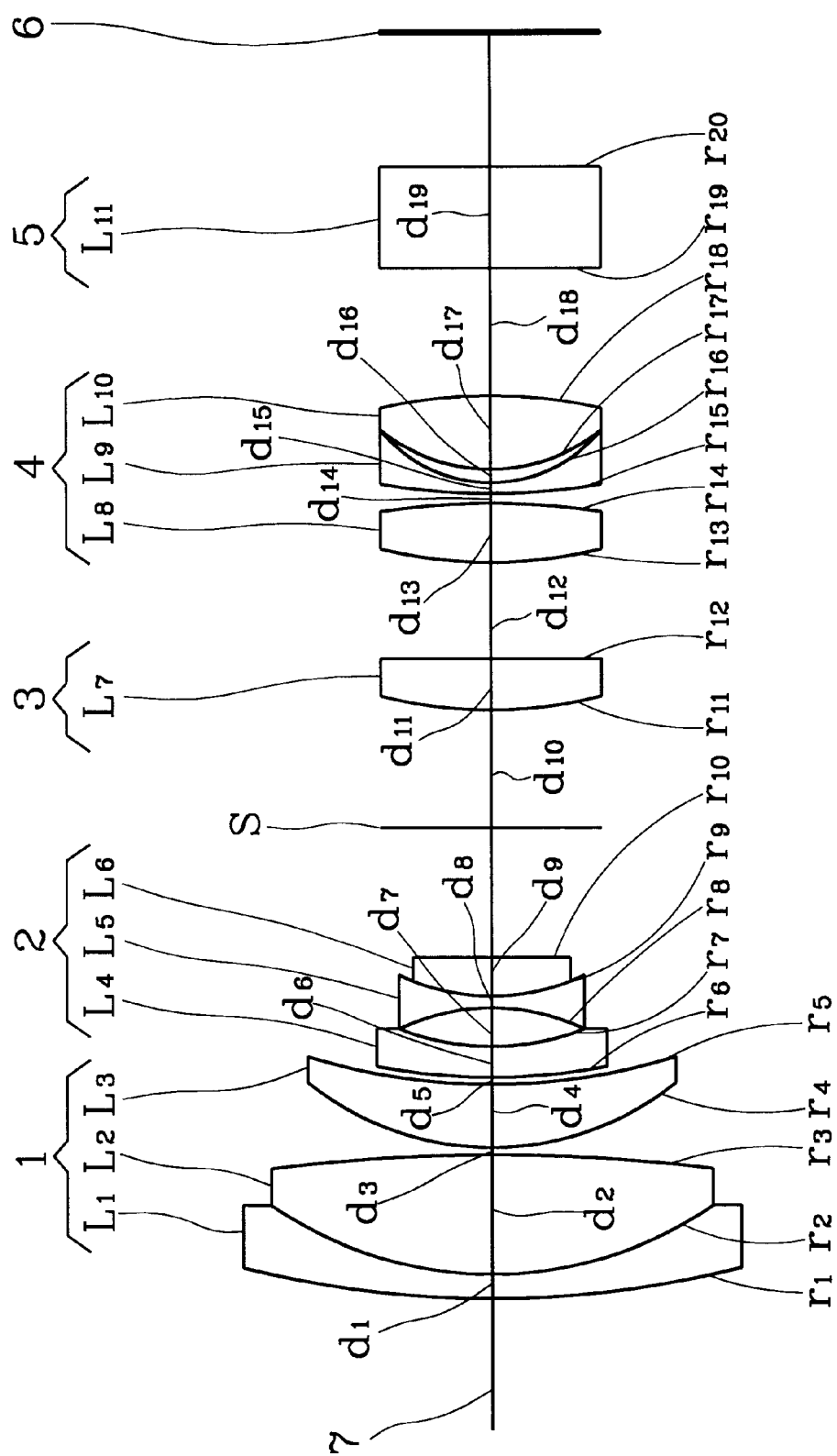
FIG. 1 is a schematic view of a conventional zoom lens structure.
Figure 2:
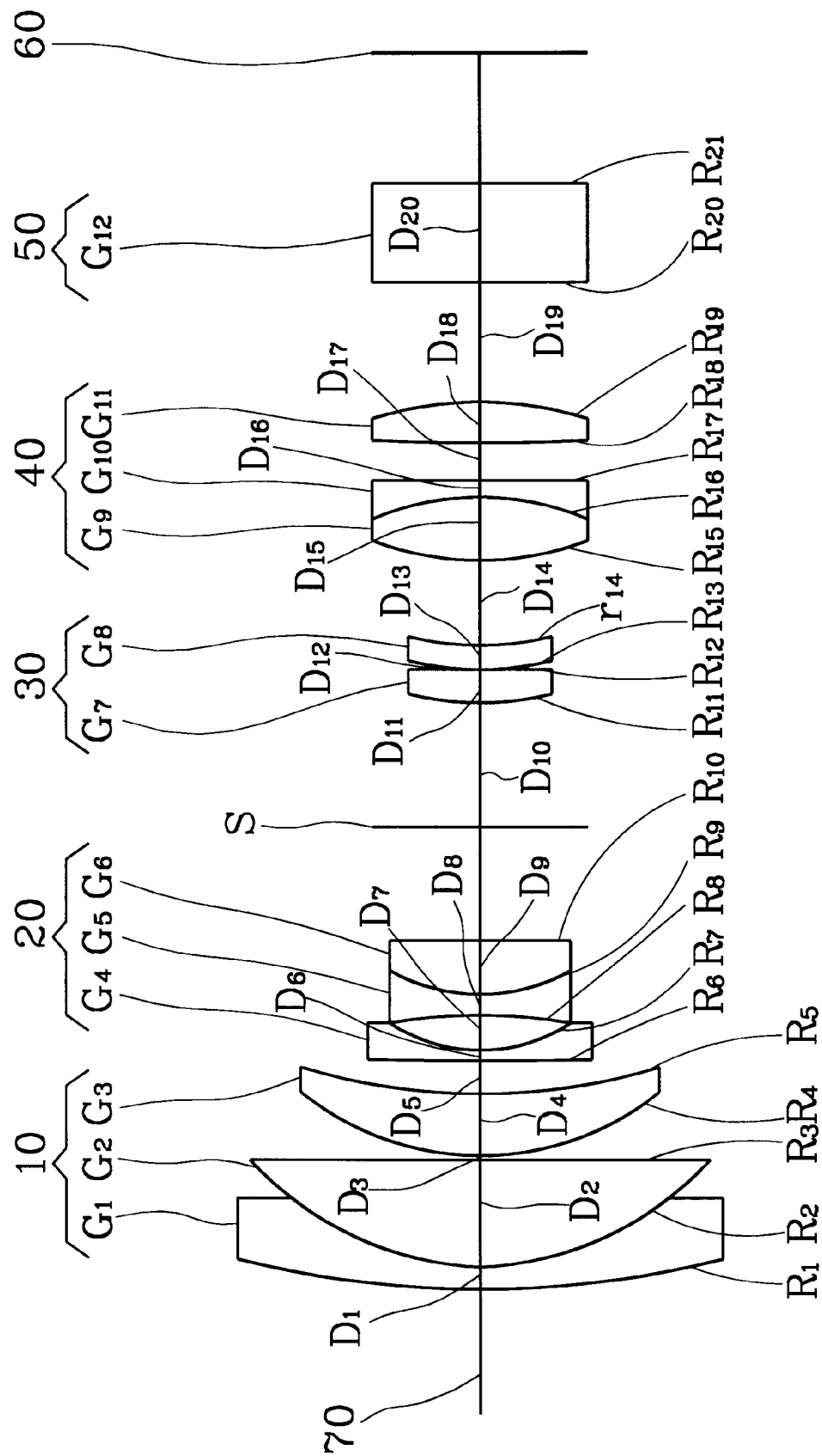
FIG. 2 is a schematic view of the structure of this invention.

Referring to FIG. 2, the improved zoom lens of this invention includes four lens groups 10, 20, 30 and 40 of different focal length. Each lens group constitutes a plurality of lenses G1–G12 each has different focal length D1–D20. The radius of curvature R1–R21 of the lenses are also different. The focal points of all lenses are on a same optimal axis 70. Behind the four lens group 40, there is a filter 50 and an image plane 60. Between the second and the third lens groups 20 and 30, there is a stop 5. The final image is projected on the image plane 60.

The first lens group 10 includes one negative lens G1 and two positive lenses G2 and G3 to form a composite lens with positive focal length. The negative lens G1 has two curvature radiuses R1 and R2 with two focal points D1 and D2 located on the axis 70. The positive lens G2 has same refractive index as the lens G1, and has two curvature radiuses R3 and R4 with two focal points D3 and D4. The positive lens G3 has similar optimal property as the lens G2 but with different optimal parameter values such as focal length and curvature radius.

The second lens group 20 includes one negative lens G5 and two positive lenses G4 and G6 to form a composite lens with a final negative focal length D6–D10, curvature radius R6–R10. The second lens group is movable along the axis 70 for the zoom lens to obtain an optimal zooming effect.

The third and fourth lens group 30 and 40 have respectively positive positive focal length which are derived by same principle as the first lens group 10. They constitute lenses G7–G11 with focal length D11–D19 and curvature radius R11–R14. The third lens group 30 includes a positive lens consisting of two focal length D11 and D12, and a negative lens consisting of two focal length D13 and D14. The fourth lens group 40 includes one negative lens G10 with curvature radius R11 and R17 and focal length D16 and D17, and two positive lenses G9 and G10 having focal length of D15–D11, and D18–D19 and curvature radius of R15, and R18 and R19 respectively.

The second and fourth lens group 20 and 40 are made of plastic lenses glued together for reducing weight and cost. Because of this, more non-spherical lenses may be used to produce high resolution and more pixel number image within limited adjustable focal length. The stop S is located between the second and third lens group 20 and 30 for preventing the second lens group 20 from hitting the third lens group 30 during zooming operation.

The filter 50 is located behind the fourth lens group 40 and is stationary. The third lens group 30 also is stationary. However the fourth lens group 40 is movable for enhancing resolution and image quality.

Figure 3:
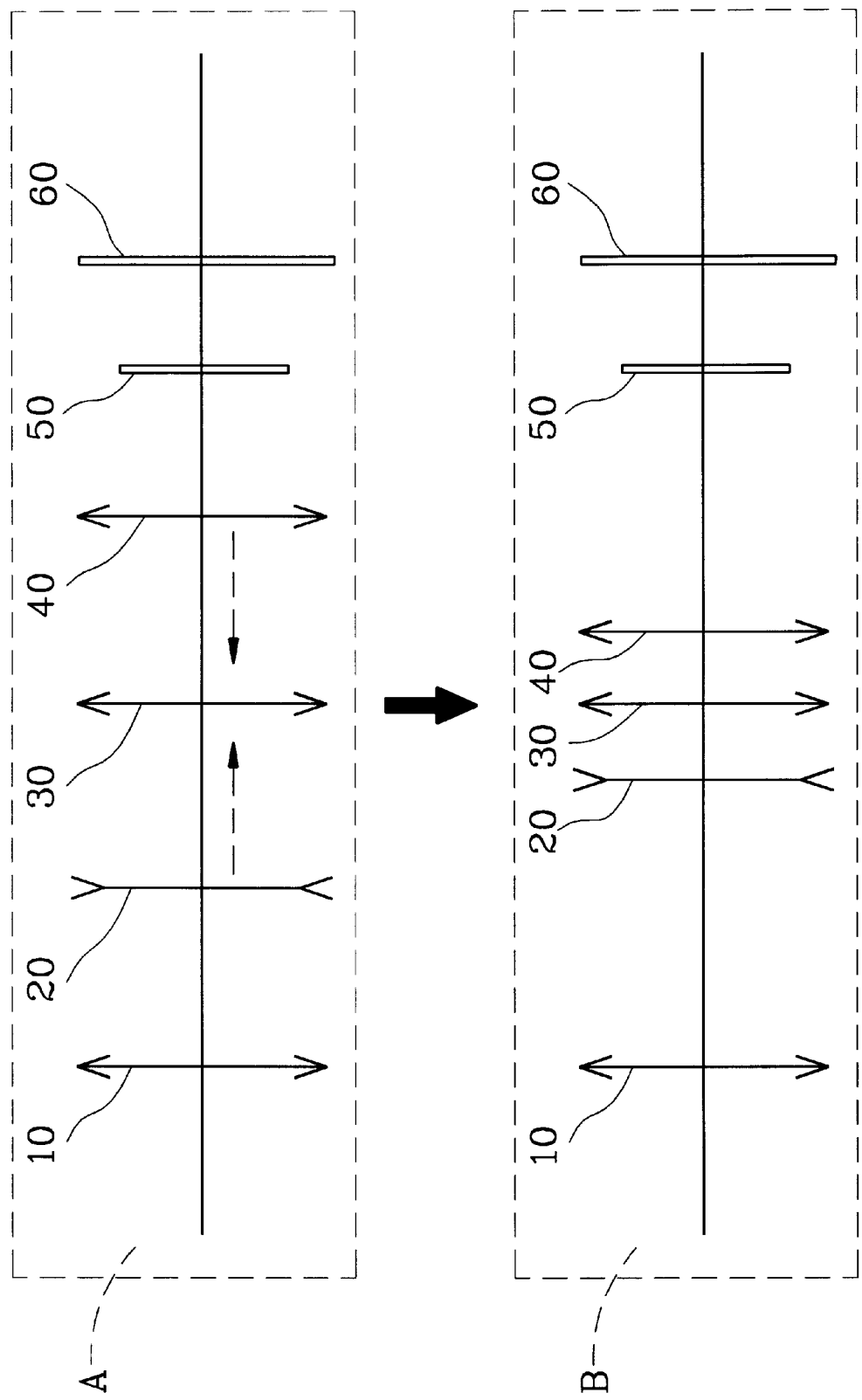
FIG. 3 is a schematic view of this invention showing respectively lens groups location for the shortest and longest focal length.

FIG. 3 illustrates this invention in use. The first and third lens group 10 and 30, the filter 50 and the image plane 60 are stationary. The negative second lens group 20 and the positive four lens group 40 are movable for obtaining optimal zooming effect and high resolution image.

According to another aspect of this invention, the absolute value ratio of focal length between the first and second lens group 10 and 20 is preferably less than 5.2 and greater than 4, and the absolute value ratio of focal length between the fourth and second lens group 40 and 20 is preferably less than 2.6 and greater than 2.1

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A zoom lens including a plurality of lenses of different focal length, comprising:
   a first lens group having a positive focal length, the first lens group including at least three lenses of different curvature radius in which one lens has a negative focal length and two lenses have positive focal lengths;
   a second lens group having a negative focal length;
   a third lens group having a positive focal length;
   a fourth lens group having a positive focal length;
   a filter located behind and spaced from the fourth lens group, and
   an image plane located behind and spaced from the filter;
   wherein the first and third lens group are stationary relative to the image plane, and the second and fourth lens groups are movable relative to the image plane for forming a high resolution image on the image plane, wherein the lenses include lenses of different curvature radius grouping to form the different lens group of different focal length.

2. The zoom lens of claim 1, wherein the first lens group includes one lens of negative focal length that faces an object and two lenses of positive focal lengths remote from the object.

3. The zoom lens of claim 1, wherein the second lens group includes three or more lenses of different curvature radius in which one lens has negative focal length and two lenses have positive focal lengths.

4. The zoom lens of claim 3, wherein the second and fourth lens group includes a glued lens to facilitate position adjustment against other lenses for performing zooming operation.

5. The zoom lens of claim 1, wherein the third lens group includes at least two lenses of different curvature radius in which one lens has positive focal length and another lens has negative focal length.

6. The zoom lens of claim 5, wherein the second and fourth lens group includes a glued lens to facilitate position adjustment against other lenses for performing zooming operation.

7. The zoom lens of claim 1, wherein the fourth lens group includes at least two lenses of different curvature radius in which one lens has positive focal length and another lens has negative focal length.

8. The zoom lens of claim 1, wherein the absolute value ratio of focal length between the first and second lens group is smaller than 5.2 and greater than 4.

9. The zoom lens of claim 1, wherein the absolute value vatio of focal length between the fourth and second lens groups is smaller than 2.6 and greater than 2.1.

10. The zoom lens of claim 1, wherein the filter is located at one end of the zoom lens and the first lens group is located at another end of the zoom lens, the distance between the filter and the first lens group being constant.

11. A zoom lens including a plurality of lenses of different focal length, comprising:
   a first lens group of positive focal length including at least three lenses of different curvature radius in which one lens has negative focal length and two lenses have positive focal length;
   a second lens group of negative focal length including at least three lenses of different curvature radius in which one lens has negative focal length and two lenses have positive focal length;
   a third lens group of positive focal length including at least two lenses of different curvature radius in which one lens has negative focal length and another lens has positive focal length;
   a fourth lens group of positive focal length including at least two lenses of different curvature radius in which one lens has negative focal length and another lens has positive focal length;
   a filter, and
   an image plane;
   wherein the focal length of the lens groups lay on an axis for forming an image to be received by the filter and forming a final image on the image plane.

12. The zoom lens of claim 11, wherein the position sequence of the lens groups from the object side is the first lens group, the second lens group, the third lens group, the fourth lens group, the filter and the image plane.

13. The zoom lens of claim 11, wherein the second and fourth lens groups are movable for adjusting focus to obtain different zooming ratio.

14. The zoom lens of claim 13, wherein the second and fourth lens groups are made of glued plastic lenses.

15. The zoom lenses of claim 11, wherein the first and third lens group are stationary.

16. The zoom lens of claim 11, wherein the absolute value ratio of focal length between the first and second lens group is smaller than 5.2 and greater than 4.

17. The zoom lens of claim 11, wherein the absolute value ratio of focal length between the fourth and second lens groups is smaller than 2.6 and greater than 2.1.

18. A zoom lens including a plurality of lenses of different focal length, comprising:
   a first lens group having a positive focal length;
   a second lens group having a negative focal length;
   a third lens group having a positive focal length;
   a fourth lens group having a positive focal length;
   a filter located behind and spaced from the fourth lens group, and an image plane located behind and spaced from the filter;

wherein the first and third lens group are stationary relative to the image plane, and the second and fourth lens groups are movable against the image plane for forming a high resolution image on the image plane and wherein the absolute value ratio of focal length between the first and second lens group is smaller than 5.2 and greater than 4.

19. A zoom lens including a plurality of lenses of different focal length, comprising:

a first lens group having a positive focal length;

a second lens group having a negative focal length;

a third lens group having a positive focal length;

a fourth lens group having a positive focal length;

a filter located behind and spaced from the fourth lens group, and an image plane located behind and spaced from the filter;

wherein the first and third lens group are stationary relative to the image plane, and the second and fourth lens groups are movable against the image plane for forming a high resolution image on the image plane, wherein the absolute value ratio of focal length between the fourth and second lens group is smaller than 2.6 and greater than 2.1.

* * * * *